United States Patent
Maillard et al.

(10) Patent No.: US 6,286,103 B1
(45) Date of Patent: Sep. 4, 2001

(54) METHOD AND APPARATUS FOR ENCRYPTED DATA STREAM TRANSMISSION

(75) Inventors: Michel Maillard, Rambouillet; Christian Benardeau, Bussy-Saint-Georges; Jean-Luc Dauvois, Paris, all of (FR)

(73) Assignee: Canal+Societe Anonyme, Paris (FR)

( * ) Notice: Subject to any disclaimer, the term of this patent is extended or adjusted under 35 U.S.C. 154(b) by 0 days.

(21) Appl. No.: 09/537,071

(22) Filed: Mar. 28, 2000

Related U.S. Application Data

(63) Continuation of application No. PCT/IB98/01610, filed on Oct. 2, 1998.

(51) Int. Cl.[7] .................................................... G06F 1/24
(52) U.S. Cl. ..................... 713/200; 713/201; 380/255; 380/268
(58) Field of Search .................................. 713/200, 201; 380/255, 268, 275, 277, 283

(56) References Cited

U.S. PATENT DOCUMENTS

| | | | |
|---|---|---|---|
| 5,185,794 | * | 2/1993 | Thompson et al. ............... 380/17 |
| 5,406,627 | * | 4/1995 | Thompson et al. ............... 380/20 |
| 5,774,548 | * | 6/1998 | Bando et al. ..................... 380/9 |
| 6,061,451 | * | 5/2000 | Muratani et al. ................. 380/201 |

FOREIGN PATENT DOCUMENTS

| | | |
|---|---|---|
| 0 599 366 A1 | 6/1994 | (EP) . |
| 0 843 438 A2 | 5/1998 | (EP) . |
| WO96/06504 | 2/1996 | (WO) . |
| WO97/38530 | 10/1997 | (WO) . |

OTHER PUBLICATIONS

Schneier, "Applied Cryptography", 1995, pp. 176, 398, 399.*

* cited by examiner

Primary Examiner—Thomas R. Peeso
(74) Attorney, Agent, or Firm—Rosenthal & Osha, L.L.P.

(57) ABSTRACT

A method and apparatus for the transmission and reception of scrambled data is disclosed. In some embodiments, the method and apparatus includes transmitting a scrambled data stream to a decoder, sending the scrambled data stream to a portable security module inserted in the decoder, descrambling the scrambled data stream, encrypting a descrambled data stream, and using the encrypted data stream to the decoder, decrypting the encrypted data stream, and using the decrypted data stream.

23 Claims, 5 Drawing Sheets

METHOD AND APPARATUS FOR ENCRYPTED DATA STREAM TRANSMISSION

This is a continuation of International Application PCT/IB98/01610, with an international filing date of Oct. 2, 1998.

The present invention relates to a method and apparatus for use with an encrypted or scrambled transmission, for example a scrambled television broadcast.

Transmission of encrypted data is well-known in the field of pay TV systems, where scrambled audiovisual information is usually broadcast by satellite to a number of subscribers, each subscriber possessing a decoder or receiver/decoder capable of descrambling the transmitted program for subsequent viewing.

In a typical system, scrambled data is transmitted together with a control word for descrambling of the data, the control word itself being encrypted by a so-called exploitation key and transmitted in encrypted form. The scrambled data and encrypted control word are then received by a decoder having access to an equivalent of the exploitation key stored on a smart card inserted in the decoder to decrypt the encrypted control word and thereafter descramble the transmitted data. A paid-up subscriber will receive in a monthly ECM (Entitlement Control Message) the exploitation key necessary to decrypt the encrypted control word so as to permit viewing of the transmission.

In order to try to improve the security of the system, the control word is usually changed every ten seconds or so. This avoids the situation with a static or slowly changing control word where the control word may become publicly known. In such circumstances, it would be relatively simple for a fraudulent user to feed the known control word to the descrambling unit on his decoder to descramble the transmission.

Notwithstanding this security measure, a problem has arisen in recent years where the stream of control words sent during a broadcast film, for example, becomes known. This information may be used by any unauthorised user who has recorded the still scrambled film on a video recorder. If the film is replayed at the same time as the stream of control words is fed to the decoder, visualisation of the film becomes possible. Provided the user manages to synchronise the film with the control stream there are no great technical problems in carrying out such a fraud, particularly since the hardware elements necessary to build the descrambler are easily obtained.

This problem has been exacerbated with the rise of the internet and it is now not uncommon to find any number of internet sites that publish the stream of control words emitted during a given transmission.

It is an object of the present invention to overcome the problems associated with known prior art techniques for scrambled transmissions so as to provide a secure decoder configuration resistant to attacks such as those described above.

According to the present invention there is provided a method of transmission and reception of a scrambled data stream in which the scrambled data stream is transmitted to a decoder, and thereafter passed to and descrambled by a portable security module inserted in the decoder and characterised in that the data stream is passed from the security module to the decoder in an encrypted form, to be decrypted and subsequently used by the decoder.

As discussed above, in conventional systems, a control word is encrypted by an exploitation key and passed from the decoder to the smart card for decryption before being passed in a decrypted form to the control unit in the decoder for descrambling of the transmission. The weak point in such techniques lies in the transmission of the control word "in clear" between the card and the decoder unit, since it is relatively easy to determine the connections between the card and the decoder and to thereafter record the control word information passing along these connections.

By identifying this weakness, and proposing a solution in which data is descrambled by a portable security module before being passed back to the decoder in an encrypted form the present invention overcomes the problems with these techniques.

According to a first type of realisation of the invention, the data stream is encrypted in the security module by a first encryption key before being passed back to the decoder for decryption using an equivalent of the first key. However, as will be described below, other realisations of the invention are possible, in which the data is passed from security module to decoder in encrypted form but in which the encryption takes place at the transmission level.

In one embodiment of the above realisation, the data stream is encrypted in the security module by a first encryption key variable in dependence on a decoder identity value, the decoder possessing an equivalent of the key and value necessary to decrypt the data. For example, the decoder identity value can correspond to the serial or batch number of the decoder.

The decoder identity value may be encrypted by a personalised key known to the security module and transmitter, the decoder identity value being transmitted in an encrypted form to the decoder for communication to the security module. Once decrypted by the personalised key within the security module the decoder identity value and first encryption key can be used by the security module to create the encrypted data stream.

Communication of the decoder identity value to the security module will necessarily involve a signal being sent from the decoder to the security module. As we have seen, the transmission of messages across this channel is relatively easy to monitor and it is thus preferable to transfer the identity value in a non-readable form to the security module.

Personalised keys of this type are known in relation to EMMs or Entitlement Management Messages, which transmit each month in encrypted form a management key for decrypting that month's ECM to a selected subscriber or group of subscribers possessing the necessary personalised key to decrypt the EMM.

In an another solution, the decoder identity value may be encrypted by a personalised key known to the security module, the encrypted decoder identity value being stored in the decoder during manufacture of the decoder for communication to the security module upon insertion of the security module in the decoder.

In an alternative to the use of a fixed decoder identity value, the first encryption key may be dependent on a random or pseudo-random number generated, for example, by the decoder and communicated to the security module.

Preferably, and in view of the problems associated in communicating non-encrypted data between the decoder and the security module, the random number is encrypted by a second encryption key before being communicated between the decoder and security module, or vice versa.

In one embodiment, the random number may be generated and encrypted by a second encryption key at the decoder and communicated to the security module for decryption by an equivalent of this second key stored in the security module.

In an alternative embodiment, the operation of the security module and decoder may simply be reversed, such that the random number is generated and encrypted by a second key in the security module and communicated to the decoder for decryption by an equivalent of the second key stored in the decoder.

In the examples given above, the first and second encryption key, the peisonalised security module key etc may all be created in accordance with a known symmetric encryption algorithm, such as DES, RC2 etc. However, in a preferred embodiment where the decoder is responsible for generation of the random number, the second key used to encrypt the random number corresponds to a public key, the security module being provided with the equivalent private key necessary to decrypt the random number value.

As compared with a portable security module such as a smart card, the hardware component in the decoder used to store the first and second encryption keys (typically a ROM) is relatively easy to isolate and monitor by means of attached contacts etc.

A dedicated fraudulent user may therefore obtain the first and second keys and, by monitoring communications between the security module and decoder, the encrypted value of the random number. If a symmetric algorithm is used for the second key, the random number may then be decrypted with the known decoder second key and fed to the known first key to decrypt the control word.

In contrast, through the use of a public key/private key arrangement, possession of the second public key held by the decoder does not enable a fraudulent user to decode the encrypted random number. Whilst it is always possible to obtain the random number directly, this is more difficult in comparison with obtaining the keys and picking up the communicated encrypted value, since the random number will be most likely generated and stored somewhere in the RAM of the decoder and can in any case change on a regular basis.

Preferably, the second private key is unique to the security module. This embodiment substantially increases the security of the system, although as will be understood the data stream communicated between the security module and decoder will be in any case dependent on the random number generated during that session.

As mentioned above, the use of a public/private key arrangement in relation to the second encryption key is particularly advantageous where the private key is stored in the security module and the public key in the decoder. However, in alternative embodiments, the situation may be reversed such that the private key is held in the decoder and the public key in the security module.

Advantageously, the second decoder key is encrypted by a third key before communication to the decoder, the decoder possessing the corresponding third key so as to decrypt and verify the second decoder key.

In a particularly advantageous embodiment, the third key used to decrypt the second decoder key is a private key, the decoder possessing the equivalent public key to decrypt and verify the communicated second key.

In all of the above embodiments of this first type of realisation, the data stream is re-encrypted by a first encryption key held in the security module before being passed to the decoder.

As mentioned, in an alternative type of realisation, the encrypted data stream passed between the security module and decoder is prepared upstream of the security module. In such realisations, the data stream is encrypted at the point of transmission by a first encryption key and decrypted by the decoder by an equivalent of this key.

In a preferred embodiment, the data stream is encrypted at the point of transmission by a first encryption key dependent on a variable known to both the transmitter and the decoder and decrypted by the decoder by an equivalent of this key and variable.

For example, the data stream may be encrypted at the point of transmission by a first encryption key dependant on the real time and/or date of transmission. In such a case, the encrypted data stream will only function at the time of transmission of the broadcast and cannot be fed into the descrambler of a decoder after the broadcast has been recorded since the decryption key of the decoder (or rather its associated variable) will now have changed.

As will be appreciated, whilst this realisation is less secure than the embodiments of first realisation discussed above, it possesses the advantage that no changes to the hardware of existing security modules are necessary. Furthermore, the modifications to the decoder and transmitter needed to implement the invention can be implemented in software, e.g. in the case of the decoder by the downloading of transmitted data.

In this second type of realisation, the encrypted data stream can be further encrypted by an exploitation key at the point of transmission, decrypted by an equivalent exploitation key in the security module and then passed in its first encrypted form to the decoder.

As described in all the above embodiments, the data stream passed in encrypted form between the security module and decoder may comprise audiovisual data. In such an embodiment, after decryption of the data stream, the decoder will simply display the audio visual data.

However, in an alternative embodiment, the data stream passed in encrypted form between the security module and decoder may comprise a control word stream, the decrypted control word stream being used thereafter by the decoder to descramble associated scrambled audiovisual data.

In such an embodiment, the "scrambling" and "descrambling" of the control word data stream as described above corresponds to the encryption and decryption of ECM messages using an exploitation key, as in conventional systems.

In order to increase the security of the system, any or all of the above described embodiments may implemented in combination with each other.

The present invention is particularly applicable to the transmission of a television broadcast. The present invention also extends to a decoder and security module adapted for a method of transmission as described above.

The term "portable security module" is used to mean any conventional chip-based portable card type devices possessing, for example, microprocessor and/or memory storage. This may include smart cards, PCMCIA cards, SIM cards etc. Included in this term are chip devices having alternative physical forms, for example key-shaped devices such as are often used in TV decoder systems.

The terms "scrambled" and "encrypted" and "control word" and "key"have been used here in a number of ways for the purpose of clarity of language. However, it will be understood that no fundamental distinction is to be made between "scrambled data" and "encrypted data" or between a "control word"and a "key".

Similarly, whilst the description refers to "receiver/decoders" and "decoders" it will be understood that the present invention applies equally to embodiments having a receiver integrated with the decoder as to a decoder unit functioning in combination with a physically separate receiver, decoder units incorporating other functionalities, and decoder units integrated with other devices, such as televisions, recording devices etc.

A number of embodiments of the invention will now be described by way of example only and in relation to the attached figures, in which.

DIGITAL TELEVISION SYSTEM

Figure 1:
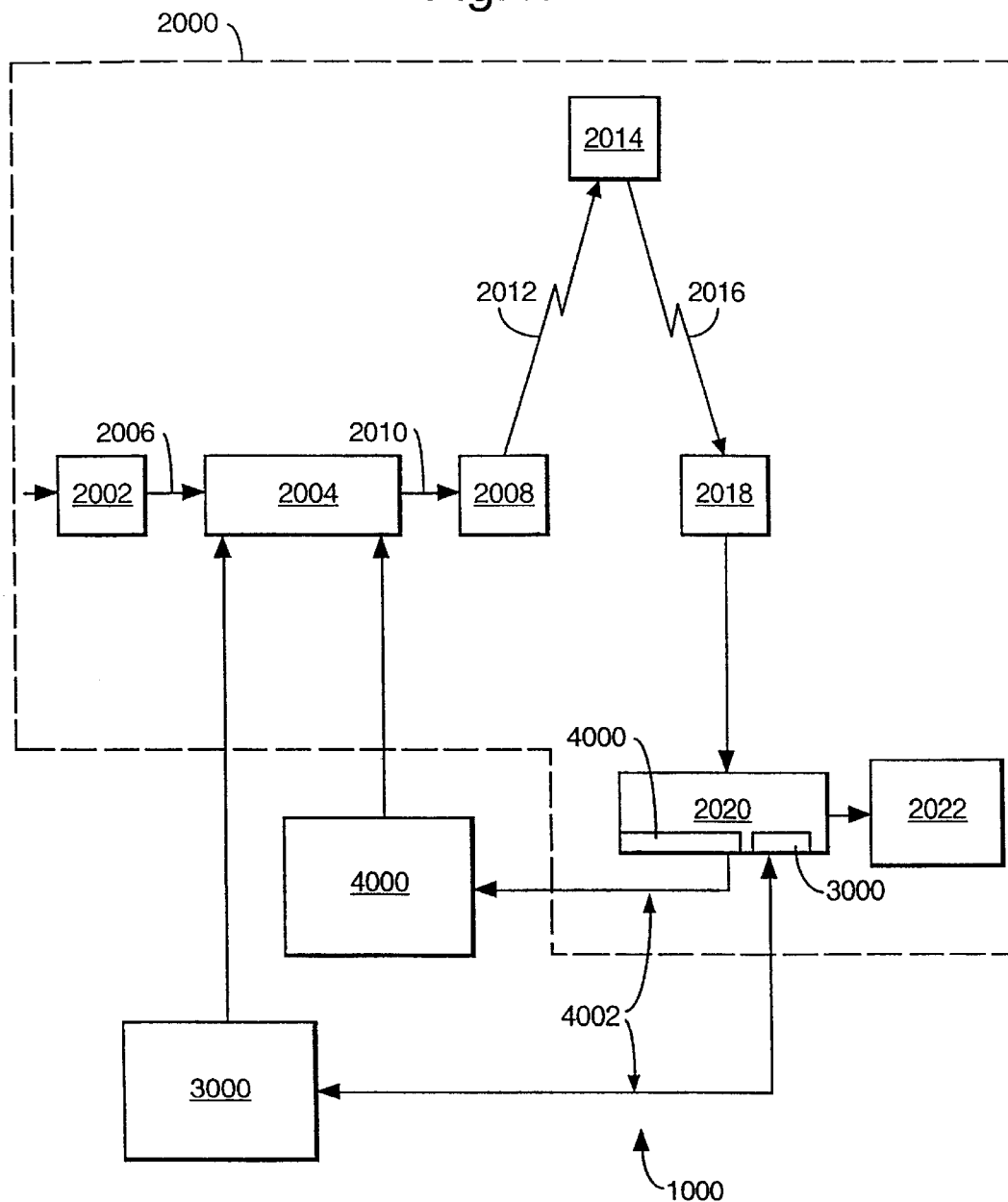
FIG. 1 shows the overall architecture of a known digital television system, as may be adapted by the present invention.

An overview of a digital television broadcast and reception system 1000 adaptable to the present invention is shown in FIG. 1. The system includes a mostly conventional digital television system 2000, which uses the known MPEG-2 compression system to transmit compressed digital signals. In more detail, the MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecom links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smart card, capable of decrypting messages relating to commercial offers (that is, on or several television programmes sold by the broadcast supplier), can be inserted into the receiver/decoder 2020. Using the decoder 2020 and smart card, the end user may purchase events in either a subscription mode or a pay-per-view-mode.

An interactive system 4000, also connected to the multiplexer 2004 and the receiver/decoder 2020 and again located partly in the broadcast and partly in the decoder, enables the end user to interact with various applications via a modemmed back channel 4002.

Conditional Access System

Figure 2:
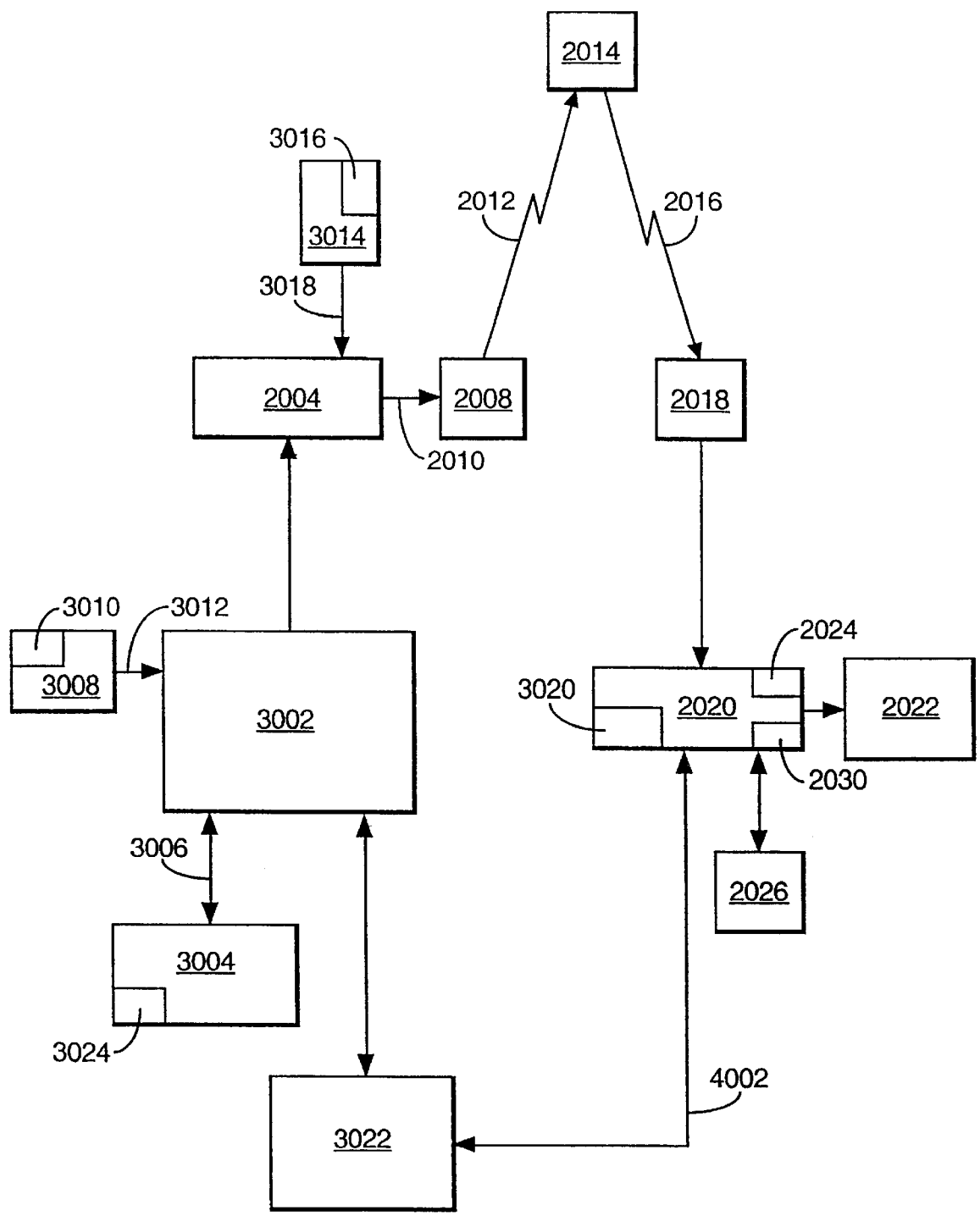
FIG. 2 shows the conditional access system of the television system of FIG. 1.

With reference to FIG. 2, the conditional access system 3000 includes a Subscriber Authorization System (SAS) 3002. The SAS 3002 is connected to one or more Subscriber Management Systems (SMS) 3004, one SMS for each broadcast supplier, by a respective TCP-IP link 3006 (although other types of linkage could alternatively be used). Alternatively, one SMS could be shared between two broadcast suppliers, or one supplier could use two SMSs, and so on.

First encrypting units in the form of ciphering units 3008 utilising "mother" smart cards 3010 are connected to the SAS by linkage 3012. Second encrypting units again in the form of ciphering units 3014 utilising mother smart cards 3016 are connected to the mutliplexer 2004 by linkage 3018. The receiver/decoder 2020 receives a "daughter" smart card 3020. It is connected directly to the SAS 3002 by Communications Servers 3022 via the modemmed back channel 4002. The SAS sends amongst other things subscription rights to the daughter smart card on request.

The smart cards contain the secrets of one or more commercial operators. The "mother" smart card encrypts different kinds of messages and the"daughter" smart cards decrypt the messages, if they have the rights to do so.

The first and second ciphering units 3008 and 3014 comprise a rack, an electronic VME card with software stored on an EEPROM, up to 20 electronic cards and one smart card 3010 and 3016 respectively, for each electronic card, one (card 3016) for encrypting the ECMs and one (card 3010) for encrypting the EMMS.

Multiplexer and Scrambler

With reference to FIGS. 1 and 2, in the broadcast centre, the digital video signal is first compressed (or bit rate reduced), using the MPEG-2 compressor 2002. This compressed signal is then transmitted to the multiplexer and scrambler 2004 via the linkage 2006 in order to be multiplexed with other data, such as other compressed data.

The scrambler generates a control word CW used in the scrambling process and included in the MPEG-2 stream in the multiplexer 2004. The control word CW is generated internally and enables the end user's integrated receiver/decoder 2020 to descramble the programme. Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, of "bouquets", thus getting the rights to watch every channel inside those bouquets. In the preferred embodiment, up to 960 commercial offers may be selected from a bouquet of channels. In the Pay Per View mode, the end user is provided with the capability to purchase events as he wishes. This can be achieved by either pre-booking the event in advance ("prebook mode"), or by purchasing the event as soon as it is broadcast ("impulse mode").

Both the control word CW and the access criteria are used to build an Entitlement Control Message (ECM); this is a message sent in relation with one scrambled program. The message contains a control word (which allows for the descrambling of the program) and the access criteria of the broadcast program. The access criteria and control word are transmitted to the second encrypting unit 3014 via the linkage 3018. In this unit an ECM is generated, encrypted with an exploitation key Cex and transmitted on to the multiplexer and scrambler 2004.

Programme Transmission

The multiplexer 2004 receives electrical signals comprising encrypted EMMs from the SAS 3002, encrypted ECMs from the second encrypting unit 3014 and compressed programmes from the compressor 2002. The multiplexer 2004 scrambles the programmes and transmits the scrambled programmes, the encrypted EMM (if present) and the encrypted ECMs as electric signals to a transmitter 2008 of the broadcast centre via linkage 2010. The transmitter 2008 transmits electromagnetic signals towards the satellite transponder 2014 via uplink 2012.

Programme Reception

The satellite transponder 2014 receives and processes the electromagnetic signals transmitted by the transmitter 2008 and transmits the signals on to the earth receiver 2018, conventionally in the form of a dish owned or rented by the end user, via downlink 2016. The signals received by receiver 2018 are transmitted to the integrated receiver/decoder 2020 owned or rented by the end user and connected to the end user's television set 2022. The receiver/decoder 2020 demultiplexes the signals to obtain scrambled programmes with encrypted EMMs and encrypted ECMs.

If the programme is not scrambled the receiver/decoder 2020 decompresses the data and transforms the signal into a video signal for transmission to television set 2022.

If the programme is scrambled, the receiver/decoder 2020 extracts the corresponding ECM from the MPEG-2 stream and passes the ECM to the "daughter" smart card 3020 of the end user. This slots into a housing in the receiver/decoder 2020. The daughter smart card 3020 controls whether the end user has the right to decrypt the ECM and to access the programme. If not, a negative status is passed to the receiver/decoder 2020 to indicate that the progranmme cannot be descrambled. If the end user does have the rights, the ECM is decrypted and the control word extracted. The decoder 2020 can then descramble the programme using this control word. The MPEG-2 stream is decompressed and translated into a video signal onward transmission to television set 2022.

Subscriber Management System (SMS)

A Subscriber Management System (SMS) 3004 includes a database 3024 which manages, amongst others, all of the end user files, commercial offers (such as tariffs and promotions), subscriptions, PPV details, and data regarding end user consumption and authorization. The SMS may be physically remote from the SAS Each SMS 3004 transmits messages to the SAS 3002 via respective linkage 3006 to enable modifications to or creations of Entitlement Management Messages (EMMs) to be transmitted to end users.

The SMS 3004 also transmits messages to the SAS 3002 which imply no modifications or creations of EMMs but imply only a change in an end user's state (relating to the authorization granted to the end user when ordering products or to the amount that the end user will be charged).

Entitlement Management Messages and Entitlement Control Messages

ECMs or Entitlement Control Messages are encrypted messages embedded in the data stream of a transmitted program and which contain the control word necessary for descrambling of a program. Authorisation of a given receiver/decoder is controlled by EMMs or Entitlement Management Messages, transmitted on a less frequent basis and which supply an authorised receiver/decoder with the exploitation key necessary to decode the ECM.

An EMM is a message dedicated to an individual end user (subscriber), or a group of end users. A group may contain a given number of end users. This organisation as a group aims at optimising the bandwidth; that is, access to one group can permit the reaching of a great number of end users.

Various specific types of EMM may be used. Individual EMMs are dedicated to individual subscribers, and are typically used in the provision of Pay Per View services. So-called "Group" subscription EMMs are dedicated to groups of, say, 256 individual users, and are typically used in the administration of some subscription services. This EMM has a group identifier and a subscribers' group bitmap.

For security reasons, the control word CW embedded in an encrypted ECM changes on average every 10 seconds or so. In contrast, the exploitation key Cex used by the receiver to decode the ECM is changed every month or so by means of an EMM. The exploitation key Cex is encrypted using a personalised key corresponding to the identity of the subscriber or group of subscribers recorded on the smart card. If the subscriber is one of those chosen to receive an updated exploitation key Cex, the card will decrypt the message using its personalised key to obtain that month's exploitation key Cex.

The operation of EMMs and ECMs will be well-known to one skilled in the art and will not be described here in any more detail.

Encryption of Data Stream by Smart Card

Figure 3:
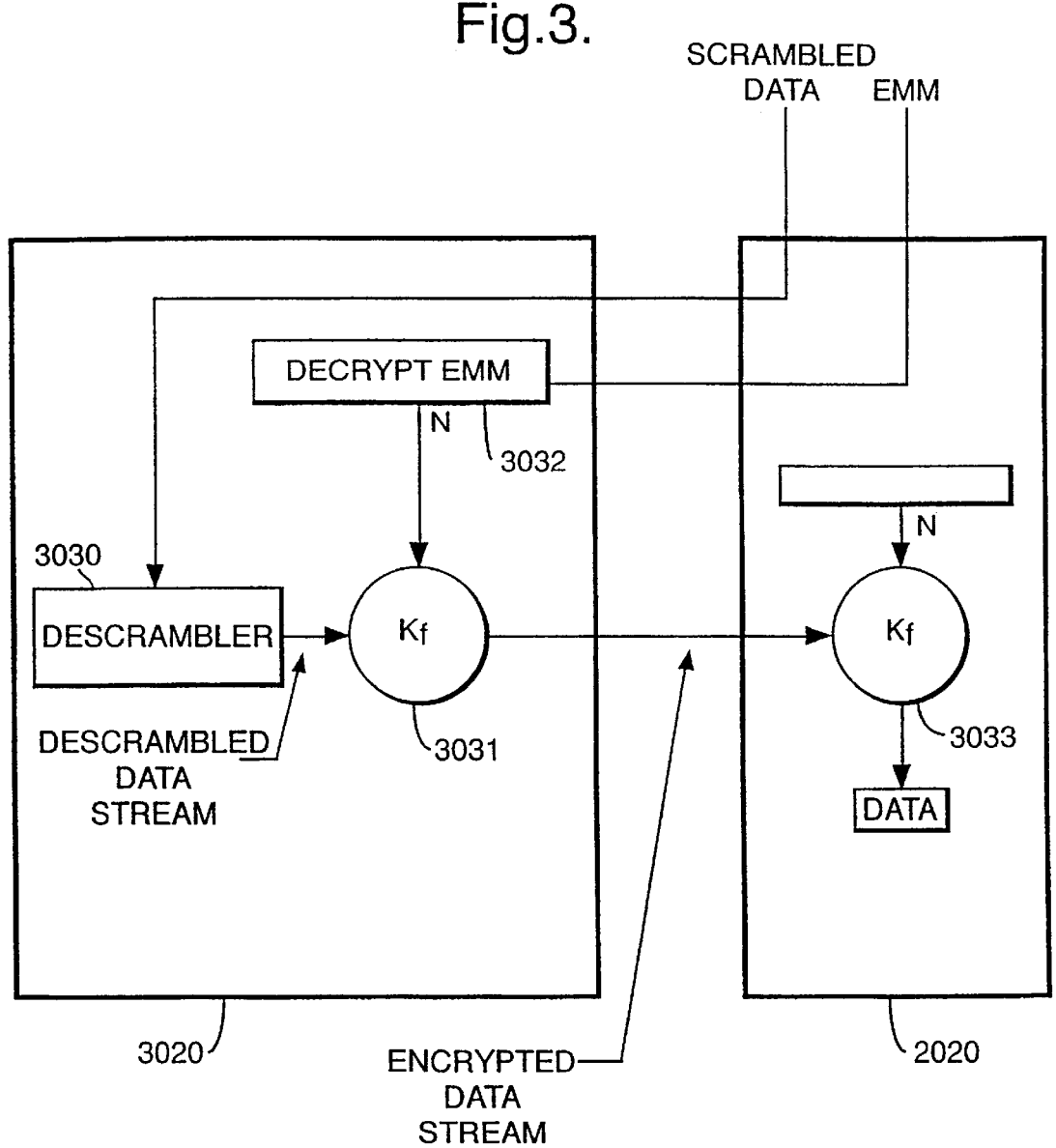
FIG. 3 shows a first embodiment of the invention.
Figure 4:
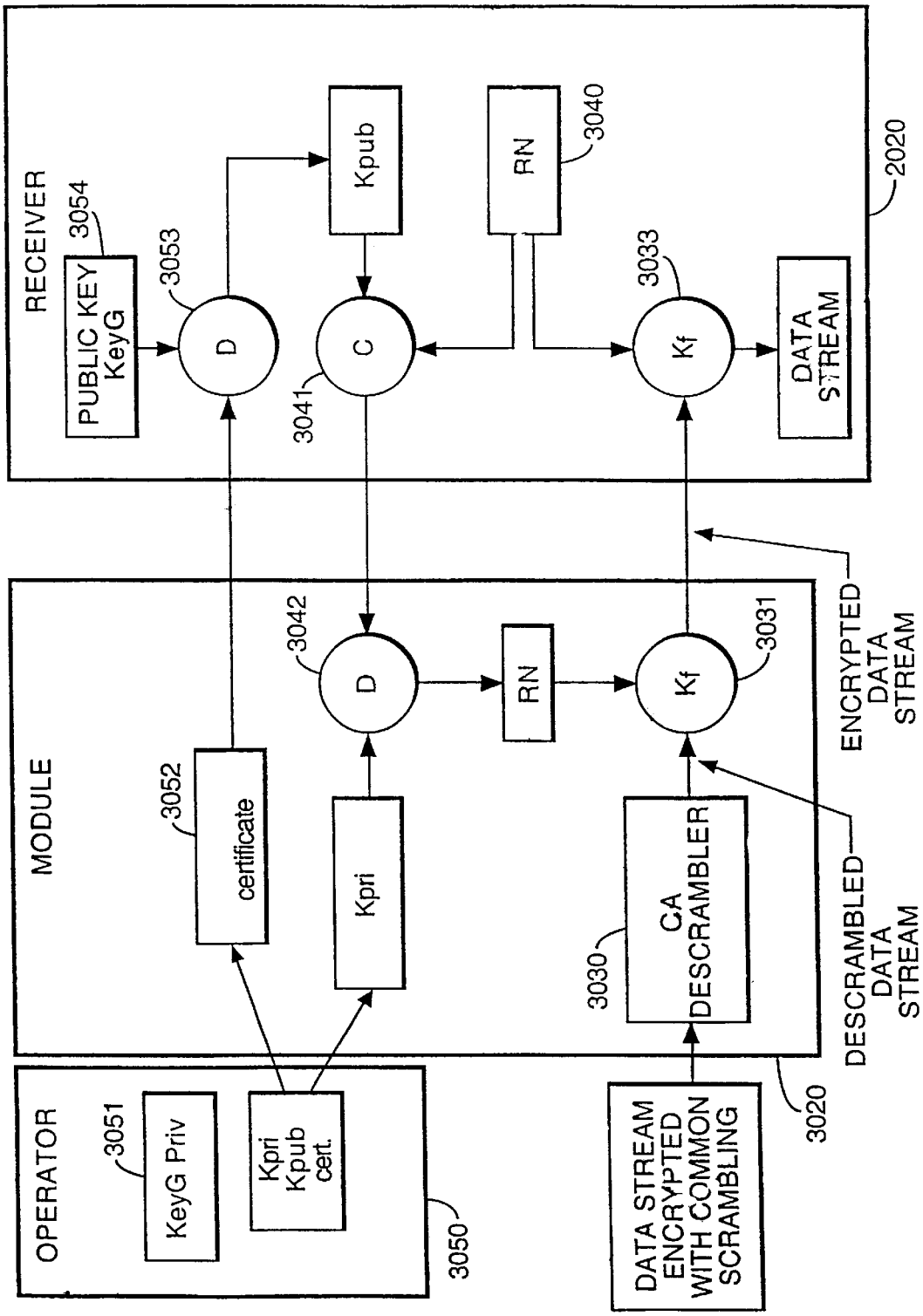
FIG. 4 shows a second embodiment of the invention.

Referring now to FIGS. 3 and 4, a number of embodiments of a first realisation of the present invention will now be described. As shown in FIG. 3, a scrambled audiovisual data stream is received by the receiver/decoder 3020 and passed to the portable security module 3020 where it is descrambled at 3030 using the exploitation key Cex possessed by the card to generate the decrypted control word CW and thereafter descramble the transmission. As will be understood, in this invention, the descrambling of a transmission is carried out entirely on the portable security module, which may comprise a smart card, a PCMCIA card etc.

Before being passed back to the decoder, the data stream is re-encrypted according to a first encryption key Kf at 3031. The operation of the key Kf is dependant on a decoder identity value N associated with the identity of the decoder, for example its serial number. This value N is communicated to the card by means of an encrypted EMM, transmitted at the initialisation of the decoder/card system and passed by the decoder 2020 to the card 3020 for decryption at the point 3032.

As with all EMM messages, the EMM containing the identity value N is encrypted by means of a personalisation key corresponding to a key held by the card and known by the transmitter of the message, which enables that card or group of cards to decode the encrypted EMM.

In an alternative embodiment, the initialising EMM can be pre-stocked in the memory of the decoder and sent to the card upon the first insertion of the card, or each time the decoder is turned on. In the latter case the card will be programmed to accept the initialising EMM only the first time that it receives it. Again, as with the transmitted EMM, the personalisation key associated with the card will be used to encrypt and decrypt the transmitted value.

Turning now to the decoder 2020, this is also provided with a key Kf and, of course, its identity or serial number N. The key Kf and number N may be stocked, for example, in the ROM of the decoder. Using the key Kf and identity value N, the decoder decrypts the descrambled data stream. In practice the identity value need not be fixed, and it would be a simple matter to reprogram the identity value N stored within the card and decoder if this proved necessary.

In this embodiment, the key Kf can most simply be created using any known symmetric key algorithm for generating a key capable of being diversified by a given value (such as the identity value N in the above example). A public/private key pairing is also conceivable, the public key being associated with the decoder, the private key with the smart card. As in conventional systems, the exploitation key and personalisation key may be generated by a symmetric algorithm.

As will be understood, the data stream is only transmitted between the card and decoder in an encrypted or scrambled form, thereby reducing the risk of the type of fraud described in the introduction of the application. Furthermore, in this embodiment, all communications between the card and decoder are in fact encrypted, thereby increasing the security of the system.

In the above embodiment, the data stream decrypted at 3030 and re-encrypted at 3031 corresponds to a stream of audiovisual data. In an alternative embodiment, the data stream may correspond to a stream of control word data, decryption of ECMs being carried out at 3030 to generate a control word stream re-encrypted at 3031 and communicated to the decoder. The decrypted control word stream produced at 3033 by the decoder is thereafter used by the decoder to descramble scrambled audiovisual data transmitted and associated with the control word stream.

The advantage of such an embodiment is that the circuitry necessary to process and descramble the flow of audiovisual data is embodied within the decoder, rather than in the security module, which handles only the decryption and re-encryption of the control word stream.

One drawback of the system of FIG. 3 lies in the fact that, although not trivial, the extraction of the key Kf and identity value N from the ROM of the decoder may carried out without too much difficulty. The embodiment of FIG. 4 overcomes this weakness.

As shown, a random or pseudo-random number RN is generated within the decoder at 3040 and passed for subsequent encryption at 3041 by a public key Kpub of a suitable public/private key algorithm, such as RSA. The corresponding private key Kpri is held by the smart card. The encrypted random number p(RN) is then passed to the smart card-which uses the private key Kpri to decrypt at 3042 the encrypted random number value p(RN).

As with the identity value N in the previous embodiment, the value RN is used at 3031 in the encryption by a symmetric key Kf of the descrambled data stream so as to obtain an encrypted data stream then passed from the card to the decoder. The communication of the original scrambled data stream from the decoder to the smart card has been omitted here in order to simplify the diagram.

On the side of the decoder, the encrypted value data stream is decrypted at 3033 using the symmetric key Kf and the random number value RN. Unlike the identity value N of the previous embodiment, the random number RN can be a frequently changing value stored in the RAM of the decoder and, as such, relatively difficult to identify. The public key Kpub and symmetric key values are stored in a more permanent fashion in the device and, as such, are less secure. However, even in the event that an unauthorised user manages to obtain these keys, and the encrypted value p(RN), it will not be possible to generate the RN value needed to decrypt the data stream from this information because of the nature of private/public key algorithms and the security of the control word will remain uncompromised.

The same public/private key pair can be used for a series of decoders and cards. However, the level of security will be increased through the use of a unique public/private key pair associated with that smart card.

As shown, the values of Kpub and Kpri are generated by the system operator shown at 3050 and embedded in the smart card 3020. The value of Kpub will then be communicated to the decoder at the moment of insertion of the smart card in the decoder. Since the public key Kpub will be used to encrypt the random number RN it is used important for the decoder to verify the origin of this key, for example to prevent the decoder communicating information in response to the reception of a public key belonging to a fraudulent user.

To this end, the public key Kpub is encrypted by a private key KeyG unique to the operator and shown at 3051, the certificate containing Kpub thereafter being communicated to and stored in the smart card 3020 at 3052. At the moment of insertion of the card in the decoder, the certificate is decrypted and authenticated by the decoder at 3053 using the equivalent public key KeyG stored at 3054. The value of Kpub thus obtained will thereafter be used for the subsequent encryption steps.

Whilst the data stream described at 3030 and re-encrypted at 3031 has been described in relation to audiovisual data, this may equally correspond to a stream of control word data. As before, in such an embodiment, ECMs containing the control word are decrypted at 3030 and re-encrypted at 3031 for transmission to the decoder. The decrypted control word data obtained at 3033 is then used by the decoder to descramble an associated audiovisual data stream.

Encryption of Data Stream at Transmitter

The above embodiments relate to a first type of realisation of the invention in which the encryption of the data stream communicated from the card to the decoder is carried out by the smart card itself. In the following embodiment, an alternative realisation will be described with reference to FIG. 5 in which the encryption is carried out further upstream, at the transmitter. As will become clear, this is in addition to the conventional encryption or scrambling of the data stream.

Figure 5:
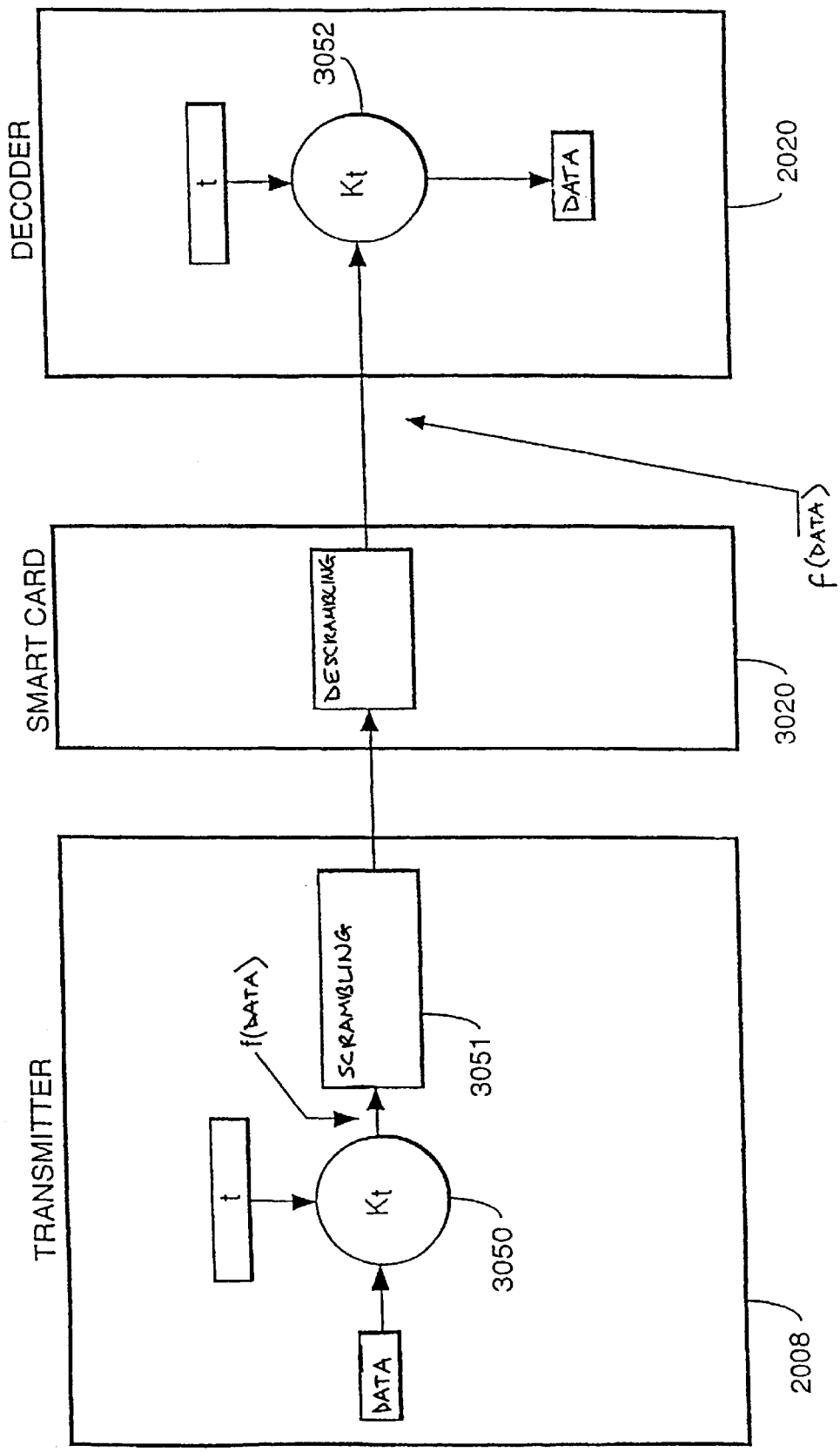
FIG. 5 shows a third embodiment of the invention.

FIG. 5 represents the flow of information in this embodiment between the transmitter 2008, smart card 3020 and decoder 2020. As will be appreciated, whilst this figure shows the information being transmitted directly between transmitter and smart card in order to simplify the explanation, any signals received by the smart card will have of course been received and communicated to the card via the receiver/decoder unit. Similarly, whilst the transmitter has been represented as a single functional block in this case, the encryption of the transmitted message may be carried out by separate elements of the system, as described in relation to FIGS. 1 and 2.

In this embodiment, the audiovisual data stream is encrypted at 3050 by an encryption key Kt, the exact value of which is dependant on a universal variable t known to all elements of the system, for example, the real time and/or date of transmission. The encrypted data f(DATA) is then scrambled as in conventional systems at 3051 by a control word and the resulting encrypted and scrambled data transmitted and communicated to the security module 3020 within the decoder 2020. The scrambled data is then descrambled at 3020 by the security module.

Unlike existing systems, the data will still be in an encrypted form f(DATA) and will be passed. in this form to the decoder 2020 for decryption at the point 3052. The decoder 2020 also possesses an equivalent of the key Kt and, if universally available information such as time and/or date is used, will also be in possession of the value t. The data may then be decrypted and processed by decoder.

By using a changing universal variant, the system avoids the problem that any recording of the encrypted control stream f(CW) obtained by monitoring the card/decoder communications could be used by unauthorised users in the future, since the control stream usable at the moment of transmission will not be usable by a decoder at a future time/date. In contrast, the fact that a universal variable is chosen means that no explicit communication of this variable between the transmitter/decoder is necessary.

In the above described embodiment, the security module 3020 carries out on-board descrambling of the encrypted and scrambled data, using an exploitation key to decrypt a stream of ECM data (not shown) so as to obtain control word data needed for the first descrambling step.

In an alternative embodiment, the steps shown in FIG. 5 may be carried out on the control word data itself, by encrypting at 3051 the once-encrypted control word data using an exploitation key Cex, carrying out a first decryption on the card 3020 using the equivalent exploitation key and thereafter carrying out a second decryption at 3052 using the value t to obtain control word data in clear form. This may then be used to descramble associated scrambled audiovisual data received by the decoder.

Whilst less secure than the previous embodiments, this type of system has the advantage that it may be simply implemented in existing systems without any need, for example, to generate new smart cards and the modifications needed to the decoder and transmitter units may be introduced by reprogramming.

As will be understood, all of the embodiments described with reference to FIGS. 3 to 5 may be implemented separately or in any combination to increase the level of security, if required.

What is claimed is:

1. A method of transmission and reception of a scrambled data stream comprising:
    transmitting a scrambled data stream to a decoder;
    sending the scrambled data stream to a portable security module inserted in the decoder;
    descrambling the scrambled data stream;
    encrypting a descrambled data stream;
    sending the encrypted data stream to the decoder;
    decrypting the encrypted data stream; and
    using the decrypted data stream.

2. A method as claimed in claim 1, in which the data stream is encrypted in the security module by a first encryption key before being passed back to the decoder for decryption using an equivalent of the first key.

3. A method as claimed in claim 2 in which the data stream is encrypted in the security module by a first encryption key variable in dependence on a decoder identity value, the decoder possessing an equivalent of the key and value necessary to decrypt the data stream.

4. A method as claimed in claim 3 in which the decoder identity value is encrypted by a personalised key known to the security module and transmitter, the decoder identity value being transmitted in an encrypted form to the security module for communication to the security module.

5. A method as claimed in 3 in which the decoder identity value is encrypted by a personalised key known to the security module, the encrypted decoder identity value being stored in the decoder during manufacture for communication to the security module upon insertion of the security module in the decoder.

6. A method as claimed in claim 2 in which the data stream is encrypted in the security module by a first encryption key dependant on a random or pseudo-random number.

7. A method as claimed in claim 6, in which the random number is communicated between the decoder and security module encrypted by a second encryption key.

8. A method as claimed in claim 7, in which the random number is generated and encrypted by the second encryption key in the security module and communicated to the decoder for decryption by an equivalent of the second key stored in the decoder.

9. A method as claimed in claim 7 in which the random number is generated and encrypted by the second encryption key at the decoder and communicated to the security module for decryption by an equivalent of the second key stored in the security module.

10. A method as claimed in claim 9 in which the second key used to encrypt the random number in the decoder corresponds to a public key, the security module being provided with the equivalent private key necessary to decrypt the random number value.

11. A method as claimed in claim 9 in which at least the second key held by the security module is unique to that security module.

12. A method as claimed in 7, in which the second key held by the decoder is encrypted by a third key before communication to the decoder, the decoder possessing the corresponding third key so as to hereby decrypt and verify the second decoder key.

13. A method as claimed in claim 12, in which the third key used to encrypt the second decoder key is a private key, the decoder possessing the equivalent public key to decrypt and verify the communicated second key.

14. A method as claimed in claim 1 in which the data stream is encrypted at the point of transmission by a first encryption key and decrypted by the decoder by an equivalent of this key.

15. A method as claimed in 14 in which the first encrypted data stream is further scrambled at the point of transmission, descrambled in the security module and then passed in its first encrypted form to the decoder.

16. A method as claimed in 1 in which the data stream passed in encrypted form between the security module and decoder comprises audiovisual data.

17. A method as claimed in 1 in which the data stream passed in encrypted form between the security module and decoder comprises a control word stream, the control word stream once decrypted by the decoder being thereafter used by the decoder to descramble associate scrambled audiovisual data.

18. A method as claimed in 1 in which the scrambled data stream is transmitted as part of a television broadcast.

19. A method of transmission and reception of scrambled data as claimed in claim 2, further comprising:
    encrypting the data stream at the point of transmission by a first encryption key; and
    decrypting the data stream by the decoder by an equivalent of the first encryption key.

20. A method of transmission and reception of a scrambled data stream comprising:
    transmitting a scrambled data stream to a decoder;
    sending the scrambled data stream to a portable security module inserted in the decoder;
    descrambling the scrambled data stream;
    encrypting a descrambled data stream at a point of transmission using a first encryption key, wherein the first encryption key is dependant upon a variable known to both a transmitter and a decoder;
    sending the encrypted data stream;
    decrypting the encrypted data stream using an equivalent of the first encryption key and the variable; and
    using the decrypted data stream.

21. The method of claim 20, wherein the variable corresponds to a real time and date of transmission.

22. The method of claim 20, wherein the variable corresponds to a real time of transmission.

23. The method of claim 20, wherein the variable corresponds to a date of transmission.

* * * * *